United States Patent [19]

Girard

[11] Patent Number: 5,058,308
[45] Date of Patent: Oct. 22, 1991

[54] FISH ALARM APPARATUS

[76] Inventor: Charles J. Girard, 27 Elaine Ave., Peabody, Mass. 01960

[21] Appl. No.: 657,419

[22] Filed: Feb. 19, 1991

[51] Int. Cl.$^5$ ...................... A01K 97/10; A01K 97/12
[52] U.S. Cl. .......................................... 43/17; 43/21.2
[58] Field of Search ................................... 43/17, 21.2

[56] References Cited

U.S. PATENT DOCUMENTS

| | | | |
|---|---|---|---|
| 3,835,568 | 9/1974 | Whitfield | 43/17 |
| 4,236,339 | 12/1980 | White | 43/17 |
| 4,458,437 | 7/1984 | Ou | 43/17 |
| 4,766,688 | 8/1988 | Hiles | 43/17 |
| 4,964,233 | 10/1990 | Benson et al. | 43/17 |

FOREIGN PATENT DOCUMENTS 2453690  5/1976  Fed. Rep. of Germany .......... 43/17

Primary Examiner—Richard K. Seidel
Assistant Examiner—Jeanne M. Elpel
Attorney, Agent, or Firm—Leon Gilden

[57] ABSTRACT

An apparatus including at least one fishing pole support socket for securing a fishing pole therewithin, wherein the fishing pole includes a fishing line directed through a bifurcated mount including a first and second leg biased towards one another to permit the fishing line to be released therefrom upon a fish strike. The bifurcated mount is secured to a spring support post, with a switch mounted to the support post that actuates an alarm upon a fish strike.

11 Claims, 5 Drawing Sheets

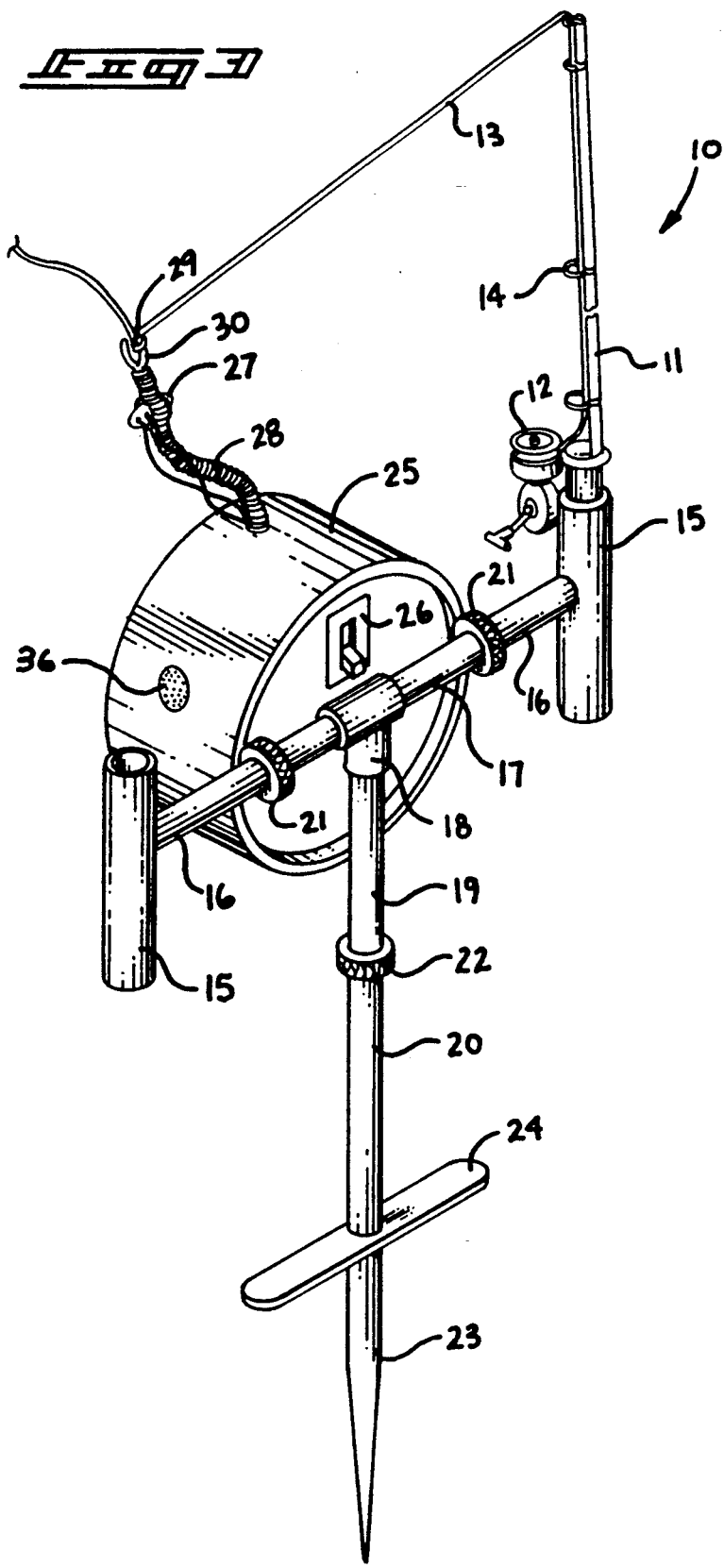

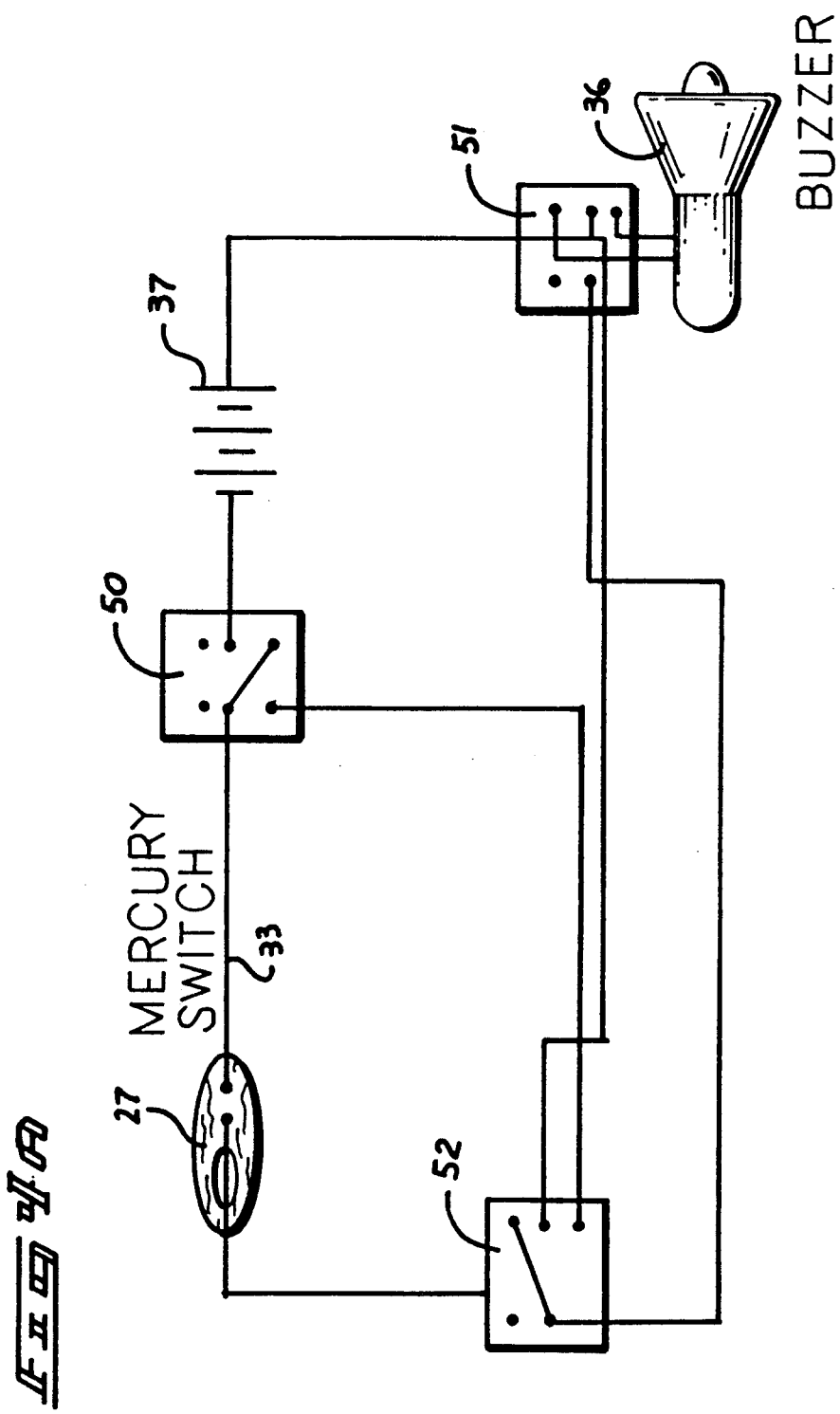

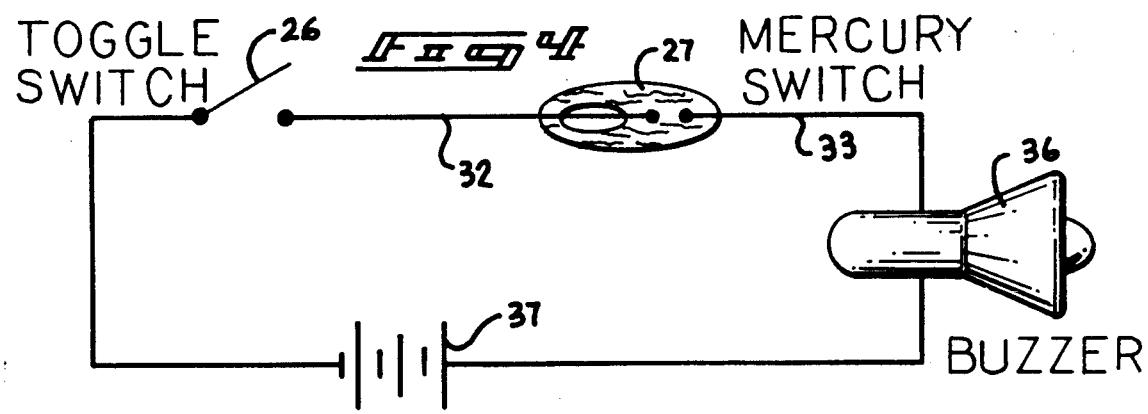
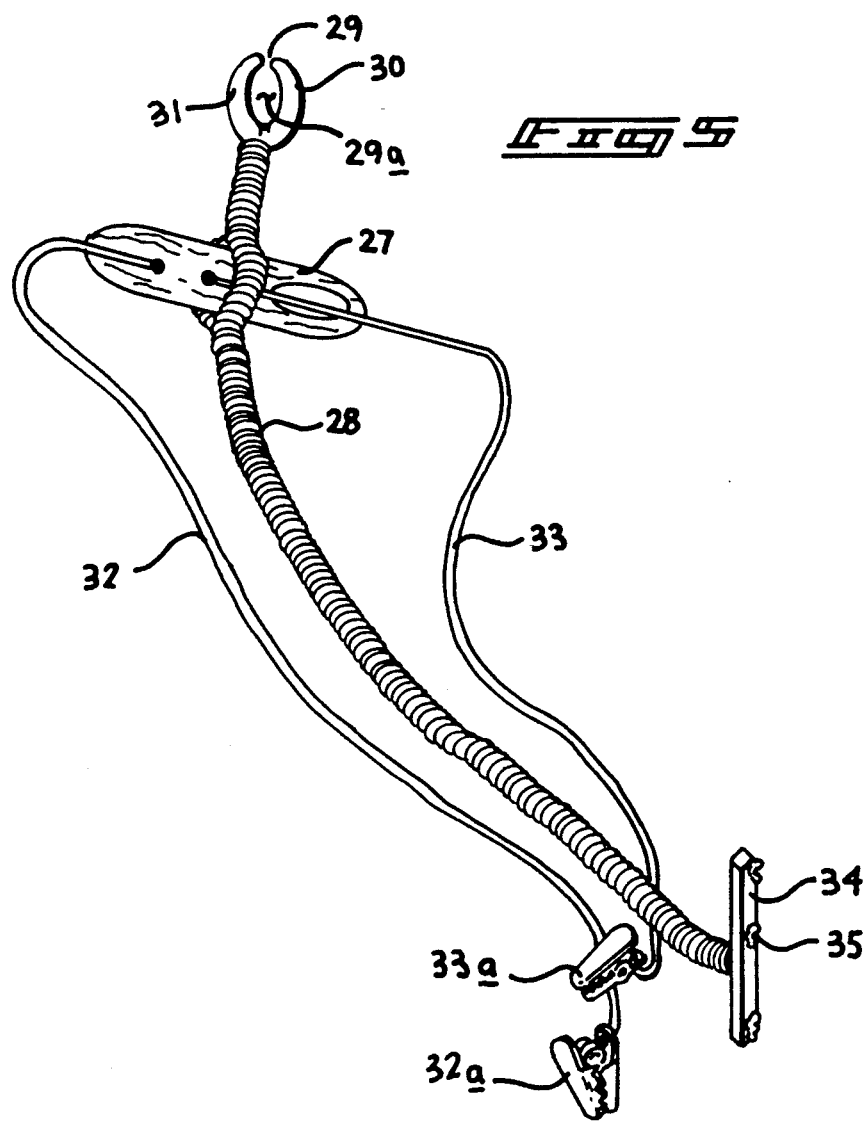

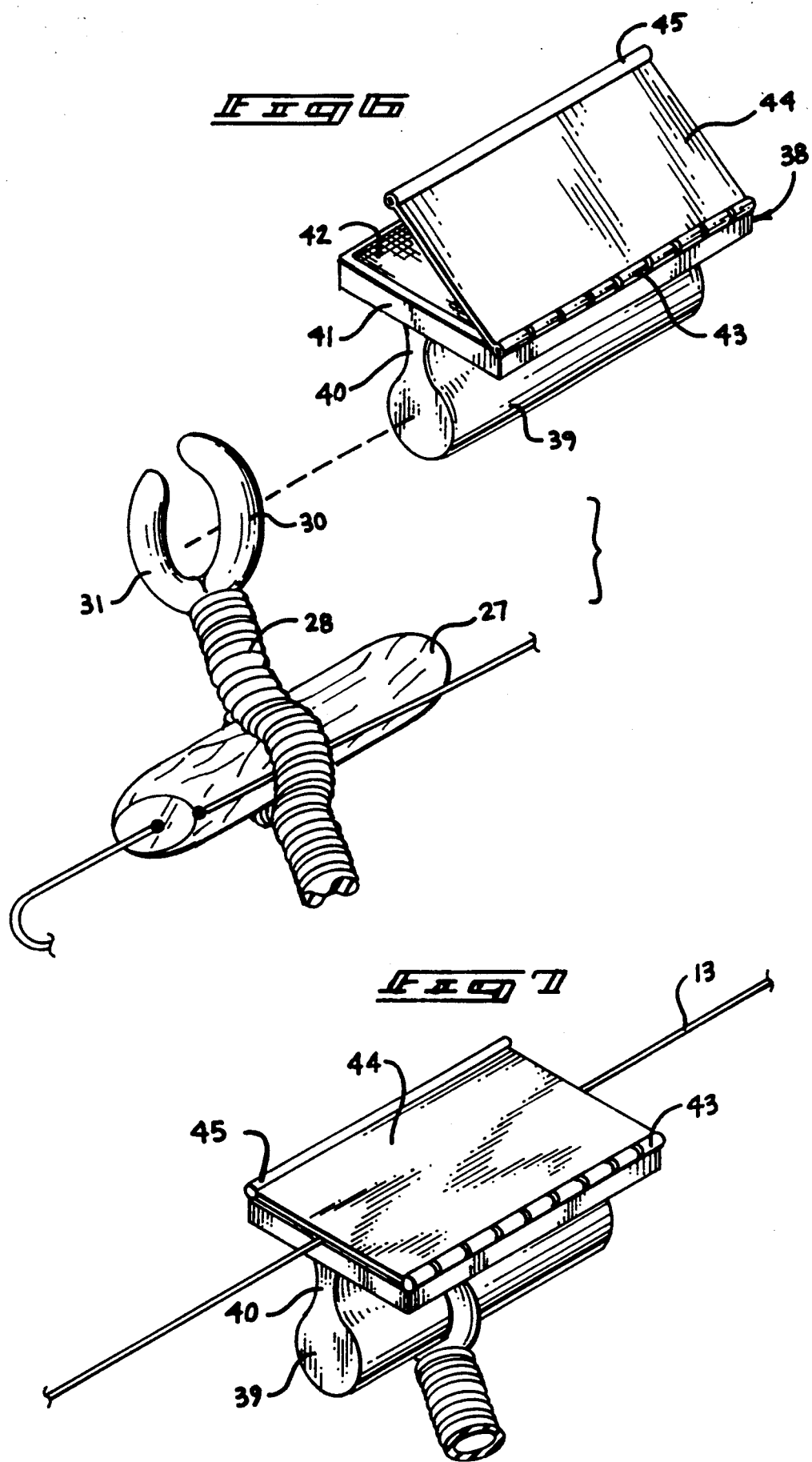

FISH ALARM APPARATUS

BACKGROUND OF THE INVENTION

1. Field of the Invention

The field of invention relates to fishing alarm apparatus, and more particularly pertains to a new and improved fish alarm apparatus wherein the same effects actuation of an alarm upon a fish strike.

2. Description of the Prior Art

Various fishing alarm apparatus has been set forth in the prior art to provide indication of a fish strike by an individual. Such organizations may be found in U.S. Pat. No. 4,398,185 to Roberts, Sr. wherein an alarm organization is mounted to an associated fishing pole.

U.S. Pat. No. 4,811,512 to Amos provides for an audible alarm wherein a plurality of fishing lines are projected over a horizontal post in cooperation with an alarm member to effect actuation of the alarm upon a fish strike.

U.S. Pat. No. 4,520,586 to Moisan sets forth an audible and visual indicator to effect actuation of an alarm in a fish strike that may be used with a fishing organization.

U.S. Pat. No. 4,236,339 to White sets forth an alarm member mounting a fishing pole mounted upon a tripod arrangement to effect a signal for indication of a fish strike.

U.S. Pat. No. 4,458,437 to Ou wherein a signal device is operative to effect actuation of an audible member through a relay when a fish is hooked relative to an associated fishing line.

As such, it may be appreciated that there continues to be a need for a new and improved fish alarm apparatus as set forth by the instant invention which addresses both the problems of ease of use as well as effectiveness construction and in this respect, the present invention substantially fulfills this need.

SUMMARY OF THE INVENTION

In view of the foregoing disadvantages inherent in the known types of fish alarm apparatus now present in the prior art, the present invention provides a fish alarm apparatus wherein the same permits securement of a fishing line in a releasable manner through a bifurcated hook to effect actuation of an audible alarm upon a fish strike. As such, the general purpose of the present invention, which will be described subsequently in greater detail, is to provide a new and improved fish alarm apparatus which has all the advantages of the prior art fish alarm apparatus and none of the disadvantages.

To attain this, the present invention provides an apparatus including at least one fishing pole support socket for securing a fishing pole therewithin, wherein the fishing pole includes a fishing line directed through a bifurcated mount including a first and second leg biased towards one another to permit the fishing line to be released therefrom upon a fish strike. The bifurcated mount is secured to a spring support post, with a switch mounted to the support post that actuates an alarm upon a fish strike.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish alarm apparatus which has all the advantages of the prior art fish alarm apparatus and none of the disadvantages.

It is another object of the present invention to provide a new and improved fish alarm apparatus which may be easily and efficiently manufactured and marketed.

It is a further object of the present invention to provide a new and improved fish alarm apparatus which is of a durable and reliable construction.

An even further object of the present invention is to provide a new and improved fish alarm apparatus which is susceptible of a low cost of manufacture with regard to both materials and labor, and which accordingly is then susceptible of low prices of sale to the consuming public, thereby making such fish alarm apparatus economically available to the buying public.

Still yet another object of the present invention is to provide a new and improved fish alarm apparatus which provides in the apparatuses and methods of the prior art some of the advantages thereof, while simultaneously overcoming some of the disadvantages normally associated therewith.

Still another object of the present invention is to provide a new and improved fish alarm apparatus wherein the same permits support and actuation of a single or plurality of fishing lines through a single mount to effect actuation of an audible alarm upon a fish strike.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is a diagrammatic illustration of the circuitry utilized by the instant invention.

FIG. 4a is a diagrammatic illustration of a modified circuitry utilized by the instant invention incorporating a time delay.

FIG. 5 is an isometric illustration of the fishing line support mount of the instant invention.

FIG. 6 sets forth a modified fishing line mount utilized by the instant invention.

FIG. 7 illustrates a fishing line mount of the instant invention in association with a fishing line.

DESCRIPTION OF THE PREFERRED EMBODIMENT

Figure 1:
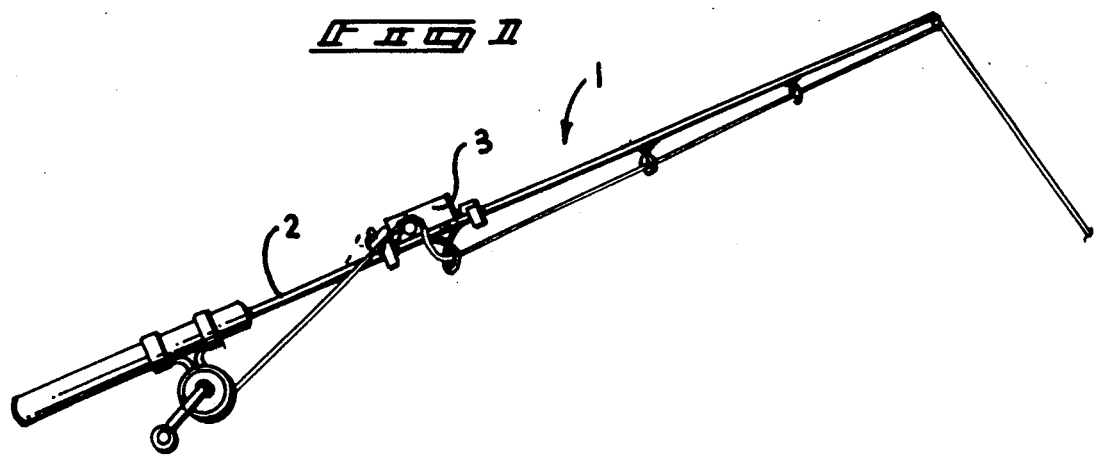
FIG. 1 is an orthographic side view, taken in elevation, of a prior art fish alarm apparatus.
Figure 2:
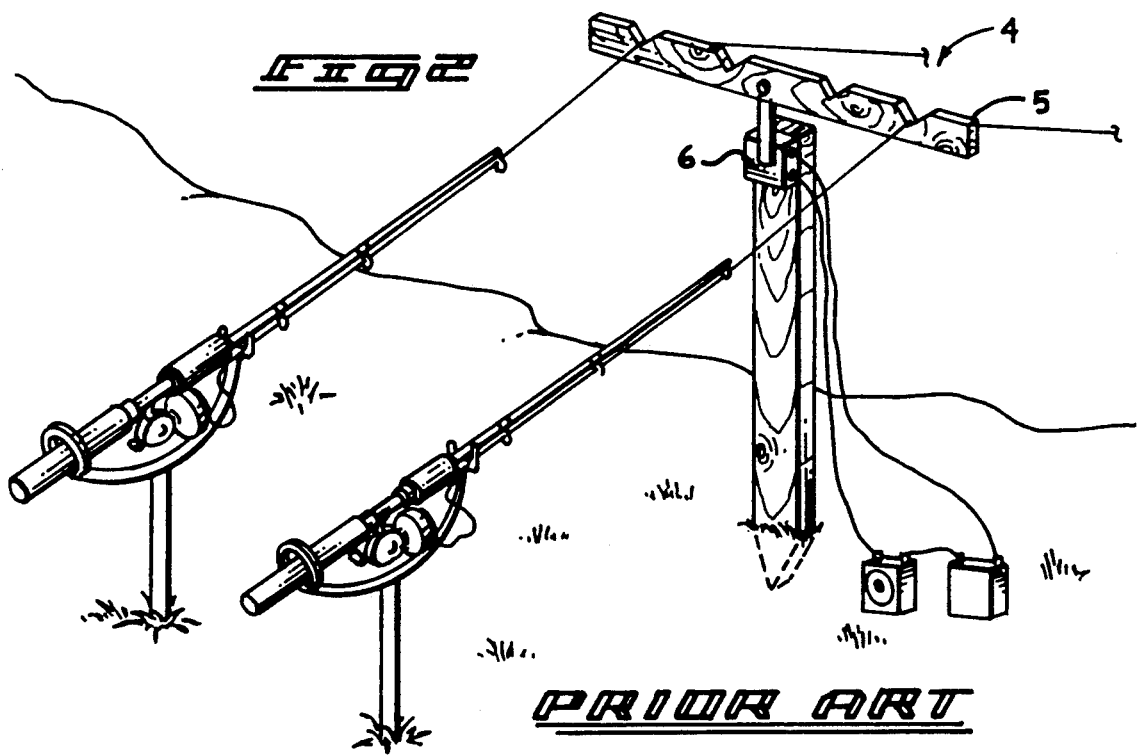
FIG. 2 is an isometric illustration of a further example of a prior art fish alarm apparatus.

With reference now to the drawings, and in particular to FIGS. 1 to 7 thereof, a new and improved fish alarm apparatus embodying the principles and concepts of the present invention and generally designated by the reference numeral 10 will be described.

FIG. 1 illustrates a prior art fish alarm apparatus 1, wherein a fishing line is directed about a fish alarm member 3 mounted upon a fishing pole 2 to effect actuation of the alarm upon a fish strike, in a manner as set forth in U.S. Pat. No. 4,398,185. U.S. Pat. No. 4,811,512 is exemplified in FIG. 2 by the numeral 4, wherein a horizontal member 5 is mounted to a fish alarm 6 to effect actuation of an audible alarm 8 through a battery pack 7 upon rotation of the member 5 relative to the actuator 6.

More specifically, the fish alarm apparatus 10 of the instant invention essentially comprises a fishing pole 11, with an associated fishing reel 12, mounting a predetermined quantity of fishing line 13 that is directed through a series of guide eyes 14, with the fishing pole 11 and its lowermost handle received within a fishing pole holding socket 15. A plurality of such sockets are arranged in a parallel relationship, with a socket support bar 16 orthogonally and fixedly mounted to each socket 15 with each support bar 16 coaxially aligned relative to one another and telescopingly received within opposed terminal ends of a central horizontal mount 17 and secured therewithin by first collet members 21. A mount holding socket 18 is fixedly mounted medially with a central horizontal mount 17, with a socket 18 directed downwardly and fixedly secured to an upper terminal end of a support post 19. The support post 19 is horizontally received within a base post 20 in a telescoping manner and securable therewithin in a vertical adjustable relationship by a second collet member 22. The base post 20 is coaxially aligned with and fixedly mounted at its lower terminal end to a spike member 23, with a depth plate 24 orthogonally and fixedly mounted between the base post 20 and the spike member 23.

A central housing 25 is fixedly mounted to a central horizontal mount 17 and the associated support post 19, and includes a switch 26 (see FIG. 4) cooperative to effect closure of a circuit, with a mercury switch 27 effecting actuation of a buzzer 36 through a battery 37, with the buzzer 36 and battery 37 contained within the housing 25. A spring steel support post 28 mounts the mercury switch 27 medially of the support post 28, with a bifurcated mount fixedly mounted at an upper terminal end of the support post 28 defined by a first leg 30 and a second leg 31 defining a gap 29 therebetween at their free upper terminal ends. An elliptical predetermined configuration is defined by the arcuate first and second legs 30 and 31. The fishing line 13 is contained within the predetermined configuration 29 and is released through the gap 29 as the first and second legs are resiliently biased towards one another and may be spread apart sufficiently to permit the fishing line 13 to be released through the gap 29 upon a fish strike, but permitting actuation of the alarm by a jarring action effected by a fish strike effecting closure of the mercury switch 27 and actuation of the buzzer 36. The mercury switch 27 includes a first and second electrical line 32 and 33 respectively, each including a first and second respective spring clip 32a and 33a at their lower terminal ends that are securable to the switch 26 and the buzzer 36 and is mounted within the housing by an attachment base 34 utilizing an adhesive or magnetic fastener 35.

An alternative fishing line mount is utilized defined by a fishing line mount 38, as illustrated in FIGS. 6 and 7. The fishing line mount 38 includes a mounting base 39 defined by a predetermined elliptical configuration equal to the predetermined elliptical configuration 29a defined by the first and second legs 30 and 31 and fixedly received therewithin. The neck 40 of the mounting base 39 is received within the gap 29. A metallic plate member 41 is orthogonally mounted onto the neck 40 and includes a fabric covering 42 to secure the fishing line 13 between the fabric covering 42 and the lid 44 that is hingedly mounted by an elongate hinge 43 to a first side of the plate member 41. The elongate opposed side of the lid 44 includes a bar magnetic 45 to releasably secure the lid 44 to the plate member 41. As is readily understood, a fish strike will effect release of the fishing line 13 from the fishing line mount 38 while simultaneously effecting actuation of the audible alarm 36 through the mercury switch 27 by the jarring action directed to the support post 28 during a fish strike.

FIG. 4a illustrates a modified circuitry utilized by the instant invention, wherein the mercury switch 27 being deactivated, the buzzer 36 will continuously buzz until reset. To this end, the mercury switch is directed to a double pole, double throw toggle switch 50 in communication with the battery 37 and a double pole, double throw relay 52. The double pole, double throw relay 52 is directed to a further double pole, double throw relay 51 in operative association with the battery 37 and the buzzer 36 to effect the audible actuation of the buzzer 36 until the double pole, double throw toggle switch 50 is turned to an off configuration.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fish alarm apparatus comprising,
at least one fishing pole holding socket vertically arranged, with a socket support bar fixedly mounted orthogonally to the holding socket, the socket support bar telescopingly received within a central horizontal mount, and
the horizontal mount including a support post orthogonally mounted to the horizontal mount, and
the support post telescopingly received within a base post, and the base post including a spike member mounted at a lower terminal end thereof for projecting of the spike member into an underlying ground support, and
a housing mounted fixedly to the central horizontal mount and the support post, the housing including a spring support post mounted therethrough, with the spring support post including an upper terminal end, with the upper terminal end arranged for releasably securing a fishing line therethrough, and
a first switch member mounted within the spring support post, and
the first switch member operatively associated with an audible alarm to effect actuation of the audible alarm upon a fish strike.

2. An apparatus as set forth in claim 1 wherein the upper terminal end of the spring support post includes a first and second leg defining a bifurcated upper terminal end, wherein the bifurcated upper terminal end includes a first and second leg defining a predetermined configuration therebetween, with a first free end of the first leg and a second free end of the second leg defining a gap therebetween, with the gap releasably securing the fishing line within the predetermined configuration.

3. An apparatus as set forth in claim 2 including a second switch member mounted to the housing, the second switch member electrically associated with a battery and the battery operatively associated with the audible alarm.

4. An apparatus as set forth in claim 3 wherein the first and second leg are resiliently biased towards one another.

5. An apparatus as set forth in claim 4 wherein the audible alarm and the battery are mounted within the housing.

6. An apparatus as set forth in claim 5 wherein the spring support post includes an attaching base, the attaching base mounted within the housing.

7. An apparatus as set forth in claim 6 wherein the first switch member is defined by a mercury switch, wherein the mercury switch including a first electrical wire and a second electrical wire, wherein the first electrical wire includes a first spring clip and the second electrical wire including a second spring clip, and the first electrical wire is releasably securable to the second switch by the first spring clip, and the second electrical wire is securable to the audible alarm by the second spring clip.

8. An apparatus as set forth in claim 7 including a depth plate orthogonally and fixedly mounted between the base post and the spike member to limit penetration of the spike member.

9. An apparatus as set forth in claim 8 including a fishing line mount, the fishing line mount including a mounting base, with the mounting base defined by a cross-sectional configuration equal to the predetermined configuration of the bifurcated mount, and the mounting base including a neck securable within the gap, and a metallic plate member orthogonally mounted on the neck, and the plate member including a first side and a second side, with a lid hingedly mounted to the plate member, including an elongate hinge mounted to the first side, and the lid including an elongate bar magnet cooperative with the second side to selectively secure the bar magnet to the plate member capturing the fishing line between the lid and the plate member.

10. An apparatus as set forth in claim 9 wherein a fabric covering is overlying the plate member to minimize abrasion to the fishing line during use.

11. An apparatus as set forth in claim 10 including a further socket and a further socket support bar mounted to the further socket, the further socket support bar telescopingly received within the central horizontal mount, and a first collet member mounted to each support bar to fixedly and telescopingly secure each socket support bar within the central horizontal mount, with socket support bar coaxially aligned with the central horizontal mount, and a second collet member telescopingly and fixedly securing the support post relative to the base post.

* * * * *